Sept. 22, 1936.   R. J. BEAVERS ET AL   2,054,787
MEASURING DEVICE
Filed Dec. 10, 1930    2 Sheets-Sheet 1

Inventors
R. J. Beavers
H. R. Laird
By H. B. Whitfield Att'y.

Patented Sept. 22, 1936

2,054,787

UNITED STATES PATENT OFFICE 2,054,787

MEASURING DEVICE

Roy J. Beavers, Brookfield, and Harold R. Laird, Chicago, Ill., assignors to Western Electric Company, Incorporated, New York, N. Y., a corporation of New York Application December 10, 1930; Serial No. 501,312

10 Claims. (Cl. 177—351)

This invention relates to a measuring device, and more particularly to a device for continuously measuring the forces exerted upon the work by the tool of a cutting or other machine.

An object of the invention is to provide a device for continuously measuring the forces such as torque and thrust exerted upon the work by a processing tool.

In general terms, the invention contemplates the mounting of the tool in a floating support so as to provide a limited amount of longitudinal and rotary movement, and the interposition of pressure sensitive devices such as piezoelectric crystals in such relation to the tool that they will be compressed by the forces exerted upon the work by the tool when the two are moved relative to each other. The pressure sensitive devices are connected to suitable electrical apparatus, whereby the various forces exerted by the tool upon the work may be continuously measured and recorded. The results of such measurement are useful in determining the machineability of the material being worked upon, and may also be used for determining the optimum angle and shape of the tool, the efficiency of various lubricants, and for other purposes.

The invention will be more fully understood from the following description, taken in connection with the accompanying drawings, wherein—

Figure 1:
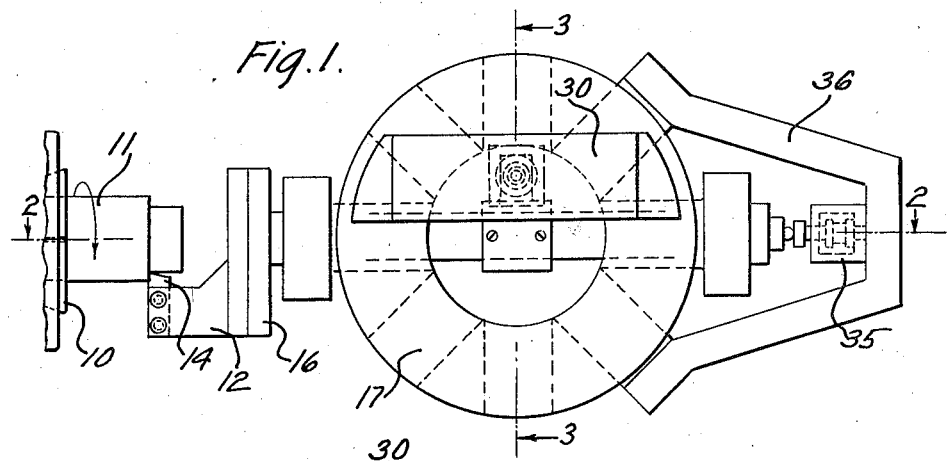
Fig. 1 is a plan view of an apparatus embodying the invention.

In the drawings, the invention is illustrated as applied to an automatic screw machine which comprises a rotary spindle 10 within which the work 11, which may be a rod of metal or other material, is mounted for rotation about its own axis. A tool holder 12 supports a cutting tool 14 rigidly in operative relation to the work, the tool holder being detachably fixed to a plate 16 which in turn is fixed to a floating spindle 18 mounted in the turret 17 of the machine. The spindle 18 is mounted in anti-friction bearings 19 and 20 which permit it a very limited amount of rotary movement, and a collar 21 encircles the spindle and is fixed thereto by set screws or other means. The collar 21 has an integral laterally extending arm 22 which carries upper and lower channel members 24 and 25 designed to cooperate with similar channel members 26 and 27 to retain an upper and lower anti-friction bearing in place, thereby to facilitate the slight fore and aft movement of the spindle 18 described below. The upper channel member 26 is fixed to a pin 28 reciprocably mounted in a box 29 which is fixed to a bracket 30 secured to the turret 17. Suitably mounted within the box 29 is a piezoelectric crystal 31 which is arranged to be compressed between plates 32 and 33 by the pin 28 in the operation of the machine. The crystal 31 is electrically connected in the circuit shown in Fig. 4 and described below.

Figure 2:
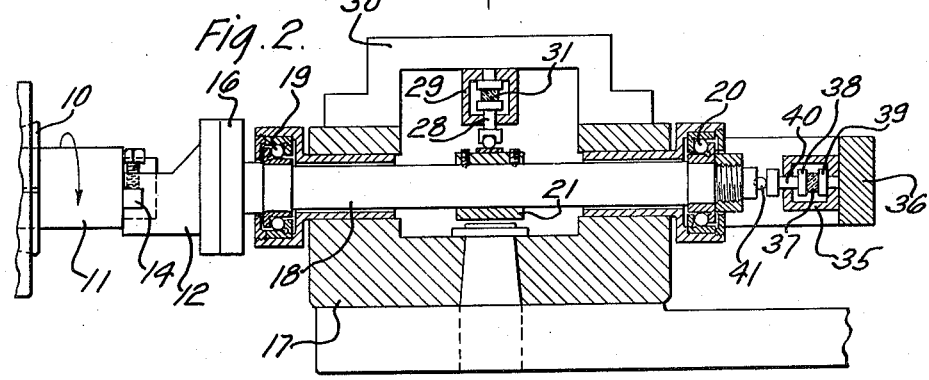
Fig. 2 is a longitudinal section of the same taken on the line 2—2 of Fig. 1.
Figure 3:
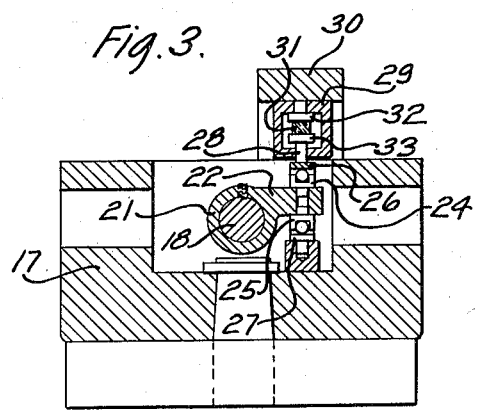
Fig. 3 is a transverse section taken on the line 3—3 of Fig. 1.

From the above description it will be seen that when the work 11 is rotated as indicated by the arrows in Figs. 1 and 2 in the operation of the machine, the tool 14 and spindle 18 tend to rotate in the same direction, but such tendency is resisted by the arm 22 compressing the crystal 31.

At the rear of the spindle 18 is mounted a box 35 supported upon a bracket 36 which is fixed to the turret 17. Within the box 35 is mounted a piezoelectric crystals 37 which is connected in a circuit similar to that shown in Fig. 4. The crystal 37 is arranged to be compressed between plates 38 and 39 by a pin 40 slidably mounted in alignment with the spindle 18, and an anti-friction bearing 41 is interposed between the spindle and the pin. From this arrangement it will be seen that when the work 11 is brought into contact with the tool the thrust exerted by the tool upon the work will be transmitted to piezoelectric crystal 37, compressing the crystal.

The crystal is so positioned within the box 29 that the plates 32 and 33 compress it along its neutral axis, and a pair of conducting members 43 and 44, preferably formed of metal foil, are secured to the crystal at opposite ends of its electric axis. Member 43 is connected by a conductor 45 to the outer grid of a double grid vacuum tube 47 while member 44 is connected by a conductor 49 to a source of current 50, and is also connected by conductor 51 to the filament of the tube and by conductor 52 to the inner grid of the tube through a source of current 53, the circuit thus far described constituting an electrostatic voltmeter. A condenser 55 and grounding key 56 shunt the members 43 and 44.

The outer grid of the vacuum tube 47 has a high impedance, preferably of the order of $10^{14}$ ohms, to prevent leakage of the electrostatic charge generated on members 43 and 44 when the piezoelectric crystal is compressed. The conductor 45 and member 43 are similarly insulated, preferably by the use of a sealing-wax mounting, and the crystal 31, tube 47, condenser 55, key 56, and the connections therebetween are electrostatically shielded as indicated at 57 in Fig. 4.

The electrostatic voltmeter just described is connected to a push-pull amplifier described below by means of a resistance coupling comprising a source of current 58 connected to the plate of tube 47 and a resistance 59 connected to conductor 51.

The amplifier may be of any known construction, and in the illustrated embodiment comprises a plurality of vacuum tubes 61 and 62 having their grids connected to the electrostatic voltmeter by conductors 64 and 65. The output of the amplifier is delivered to an oscillograph indicated diagrammatically at 67 and having a mirror 68 designed to record on a moving film 69 the fluctuations in the charge developed on members 43 and 44. A milliammeter 70 is connected in shunt with the oscillograph to give an indication of the pressures developed in the operation of the machine where the more exact readings given by the oscillograph are not required, the milliammeter circuit being opened when the oscillograph is in operation and vice versa.

In the operation of the machine, the torque exerted by the tool will compress the piezoelectric crystal 31, thereby generating an electorstatic charge on the members 43 and 44 which will vary as the torque varies. The variations in electrostatic charge will be amplified by the electrical apparatus shown in Fig. 4, and will cause the mirror 68 of the oscillograph to vibrate in the known manner, thereby tracing a record of the fluctuations upon the photographic film 69.

Figure 4:
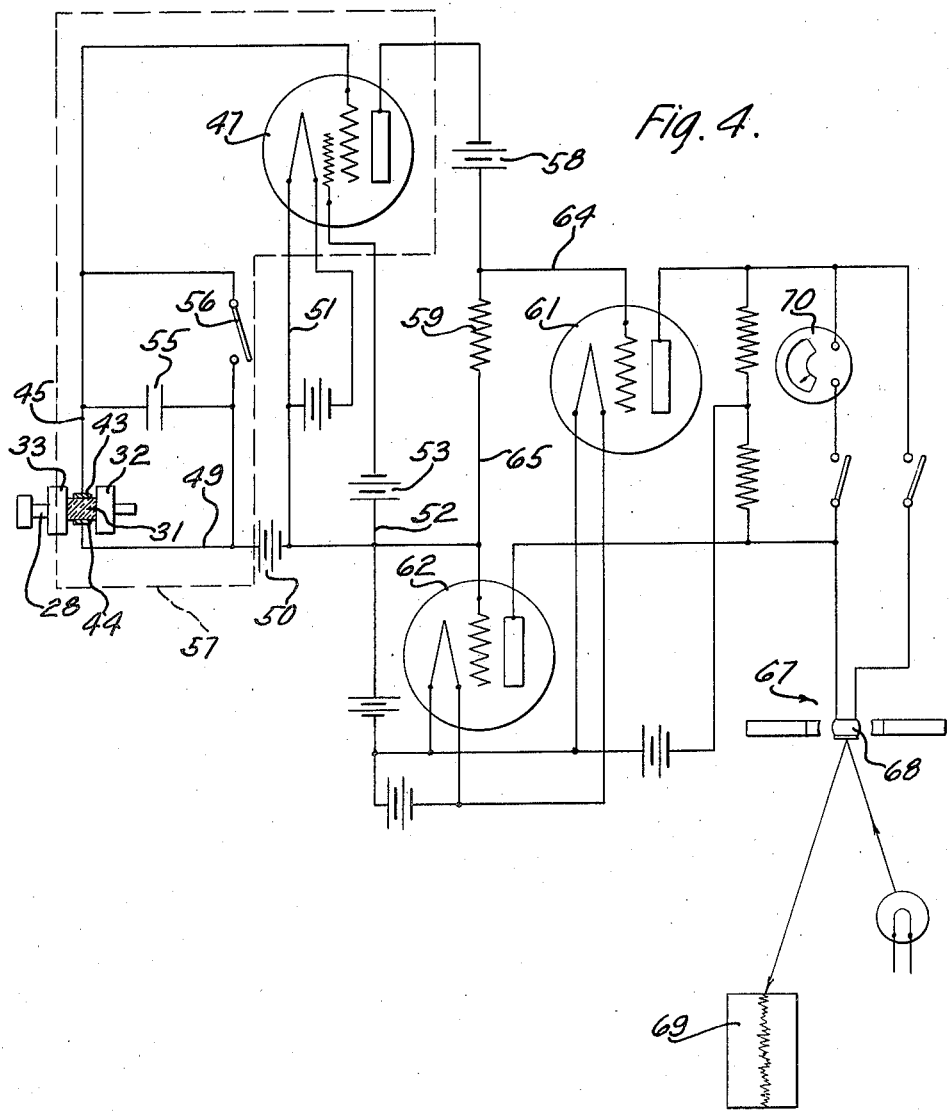
Fig. 4 is a diagrammatic illustration of the electrical measuring and recording apparatus.

In the same manner, the thrust exerted by the work upon tool 14 will cause fluctuations in the pressure on crystal 37, which pressure will generate an electrostatic charge which is a function of the pressure, and since crystal 37 is connected to an electrical apparatus similar to that shown in Fig. 4 a separate record of the fluctuations in the thrust will be made.

The apparatus is especially suitable for the measurement of extremely rapid fluctuations such as attend the formation of minute chips in the operation of a cutting tool. Due to the relative incompressibility of the crystals the moving system comprising the bar 18 and the tool holder 12 has a very high natural frequency of vibration, much higher in fact than the frequency of the fluctuations which will ordinarily be measured.

It will be apparent that the measuring apparatus may if desired be applied not only to an automatic screw machine but to lathes and other apparatus wherein a cutting or other tool and the work are moved relative to each other. The invention is, therefore, not limited to the precise details herein illustrated and described, but is limited only by the scope of the following claims.

What is claimed is:

1. The combination with an apparatus wherein a continuous and varying pressure is exerted between two elements, of means to continuously measure and record both the magnitude of and the variations in the pressure, comprising a piezoelectric crystal disposed with its neutral axis to receive pressure from said elements, a pair of electrodes engaging the crystal along the sides through which the electrical axis passes, an electronic tube having an input circuit of sufficiently high impedance to prevent discharge of an electrostatic charge on the electrodes when connected thereto and an output circuit, the electrodes of the crystal being connected to said input circuit, a condenser connected across the input circuit, normally inactive means operable for discharging the accumulated charge on the condenser, and recording means associated with said output circuit to record the magnitude of and the variation in the pressure exerted between said elements.

2. The combination with an apparatus wherein a continuous and varying pressure is exerted between two elements, of means to continuously measure and record both the magnitude of and the variations in the pressure, comprising a piezoelectric crystal disposed with its neutral axis to receive pressure from said elements, a pair of electrodes engaging the crystal along the sides through which the electrical axis passes, a condenser connected across said electrodes, normally inactive means operable for removing the accumulated charge on the condenser, a recording device to record the magnitude of and the variations in the pressure, and a translating device for associating the recording device with the electrodes of the crystal and having a sufficiently high impedance to prevent discharge of an electrostatic charge on the electrodes.

3. The combination with an apparatus wherein a continuous and varying pressure is exerted between two elements, of means to continuously measure and record both the magnitude of and the variations in the pressure, comprising a piezoelectric crystal disposed with its neutral axis to receive pressure from said elements, a pair of electrodes engaging the crystal along the sides through which the electrical axis passes, a high impedance electronic tube having a cathode, an anode, an input grid, and a potential grid, the electrodes of the crystal being connected to the cathode and the input grid and the impedance therebetween being sufficiently high to prevent discharge of an electrostatic charge on the electrodes, means for impressing a potential on the potential grid, an amplifier circuit having a substantially straight line output characteristic including a plurality of thermionic tubes having output circuits in push-pull relation, and a recording oscillograph connected to said output circuit.

4. The combination with an apparatus wherein a continuous and varying pressure is exerted between two elements of means to continuously measure and record both the magnitude of and the variations in the pressure, comprising a piezoelectric crystal disposed with its neutral axis to receive pressure from said elements, a pair of electrodes engaging the crystal along the sides through which the electrical axis passes, an electronic tube having an input circuit of sufficiently high impedance to prevent discharge of an electrostatic charge on the electrodes when connected thereto and an output circuit, the electrodes of the crystal being connected to said input circuit, a condenser connected across the input circuit, and recording means associated with said output circuit to record the magnitude of and the variations in the pressure exerted between said elements.

5. The combination with an apparatus wherein a continuous and varying pressure is exerted between two elements, of means to continuously measure and record both the magnitude of and the variations in the pressure, comprising a piezoelectric crystal disposed with its neutral axis to receive pressure from said elements, a pair of electrodes engaging the crystal along the sides through which the electrical axis passes, a condenser connected across said electrodes, recording device to record the magnitude of and the variations in the pressure, and a translating device for associating the recording device with the electrodes of the crystal and having a sufficiently high impedance to prevent discharge of an electrostatic charge on the electrodes.

6. In a material working machine having a fixed support, an arm and a cutting tool which applies torque to the arm, means to record continuously the magnitude of and the variations in the torque comprising a piezoelectric crystal interposed between the support and the arm to be compressed therebetween, electrodes on the crystal, an electrical circuit having a translating element connected to the electrodes to translate an electrostatic charge thereon into electrical unidirectional current and having a sufficiently high impedance to prevent discharge of the electrostatic charge, and a recording device connected to the element for actuation by the unidirectional current.

7. In a material working machine having a fixed support, an arm and a cutting tool which applies torque to the arm, means to record continuously the magnitude of and the variations in the torque comprising a piezoelectric crystal in the torque comprising a piezoelectric crystal interposed between the support and the arm to be compressed therebetween, electrodes on the crystal, an electrical circuit having a translating element connected to the electrodes to translate an electrostatic charge thereon into electrical unidirectional current and having a sufficiently high impedance to prevent discharge of the electrostatic charge, a recording device connected to the element for actuation by the unidirectional current, and normally inactive means operable to discharge the electrostatic charge.

8. In an apparatus for recording forces acting between a cutting tool and a piece of material being cut, means to hold the material, means to cause relative motion of the material and the tool, and means to hold the tool comprising a piezoelectric crystal mounted therein to be compressed by the tool, in combination with means to measure and record the electrostatic charge developed in the crystal by the compression thereof comprising a pair of electrodes on the crystal to collect the electrostatic charge, an electrical translating device to modify a one directional electric current in accordance with fluctuations in the electrostatic charge and of sufficiently high impedance to prevent discharge of the charge, and means to record the magnitude and the fluctuations of the current.

9. In an apparatus for recording forces acting between a cutting tool and a piece of material being cut, means to hold the material, means to cause relative motion of the material and the tool, and means to hold the tool comprising a piezoelectric crystal mounted therein to be compressed by the tool, in combination with means to measure and record the electrostatic charge developed in the crystal by the compression thereof comprising a pair of electrodes on the crystal to collect the electrostatic charge, an electrical translating device to modify a one directional electric current in accordance with fluctuations in the electrostatic charge and of sufficiently high impedance to prevent discharge of the charge, means to amplify the current, and means to record the magnitude and the fluctuations of the current.

10. In an apparatus for recording forces acting between a cutting tool and a piece of material being cut, means to hold the material, means to cause relative motion of the material and the tool, and means to hold the tool comprising a piezoelectric crystal mounted therein to be compressed by the tool, in combination with means to measure and record the electrostatic charge developed in the crystal by the compression thereof comprising a pair of electrodes on the crystal to collect the electrostatic charge, an electrical translating device to modify a one directional electric current in accordance with fluctuations in the electrostatic charge and of sufficiently high impedance to prevent discharge of the charge, means to amplify the current, means to record the magnitude and the fluctuations of the current, and normally inactive means operable to discharge a charge on the crystal.

ROY J. BEAVERS.
HAROLD R. LAIRD.